United States Patent [19]
Kuo

[11] Patent Number: 6,083,041
[45] Date of Patent: Jul. 4, 2000

[54] ELECTRICAL CONNECTOR MOUNTING ASSEMBLY

[75] Inventor: Peter Kuo, Chung-Ho, Taiwan

[73] Assignee: Hon Hai Precision Ind. Co., Ltd., Taipei Hsien, Taiwan

[21] Appl. No.: 09/304,617

[22] Filed: May 3, 1999

[30] Foreign Application Priority Data

Dec. 28, 1998 [TW] Taiwan ................................. 87221643

[51] Int. Cl.⁷ .............................. H01R 13/73; H02B 1/01
[52] U.S. Cl. ........................................... 439/553; 439/939
[58] Field of Search ................................... 439/553, 552, 439/557, 562, 939, 544, 549

[56] References Cited

U.S. PATENT DOCUMENTS

| | | | |
|---|---|---|---|
| 4,029,385 | 6/1977 | Mysiak et al. ........................... | 439/553 |
| 4,124,267 | 11/1978 | Mines et al. ............................. | 439/553 |
| 5,046,956 | 9/1991 | Takano .................................... | 439/553 |
| 5,263,871 | 11/1993 | Sano ........................................ | 439/549 |
| 5,531,613 | 7/1996 | Takano et al. .......................... | 439/553 |
| 5,697,805 | 12/1997 | Orstad et al. ............................ | 439/374 |

*Primary Examiner*—Neil Abrams
*Assistant Examiner*—Hae Moon Hyeon
*Attorney, Agent, or Firm*—Wei Te Chung

[57] ABSTRACT

Mounting assembly for attaching an electrical connector to a panel of an electronic device includes a plurality of latching members and a housing. The latching members outwardly extend from a periphery of an opening defined in the panel of the device. Each latching member includes a pair of protrusions outwardly extending therefrom. The housing includes a mating surface and a connecting surface opposite the mating surface. A cavity for receiving a connector device is defined in the mating surface of the housing. Each latching member is received in a corresponding connecting channel defined in the housing and the protrusions thereof contact a shield of the connector device.

14 Claims, 5 Drawing Sheets

ELECTRICAL CONNECTOR MOUNTING ASSEMBLY

BACKGROUND OF THE INVENTION

The present invention relates to a mounting assembly for facilely attaching an electrical connector to an electronic device, and more particularly, to a shielded connector mounting assembly.

Description of Prior Art

Bolts are commonly used to connect mating portions of an electrical connector to an electronic device such as a PC enclosure. One portion of the connector situated within the device is connected to a circuit board or related electronic components for transmitting signals between the device and other external devices. The other portion of the connector has a mating port facing an enclosure of the device. Thus, a screw set including bolts must be disposed between the enclosure of the device and the connector for attaching the connector to the enclosure of the device, which is laborious and inconvenient. Furthermore, the screw set requires several bolts extending through the enclosure of the device thereby compromising the integrity of the enclosure having compact electrical connectors attached thereto. Hence, such screw set does not promote a compact dimension of the connector.

SUMMARY OF THE INVENTION

An object of the present invention is to provide a mounting assembly for directly attaching an electrical connector to an electronic device, such as a PC panel by means of latching members thereby simplifying the assembly process thereof.

Another object of the present invention is to provide a mounting assembly having latching members directly contacting a connector shield for providing the assembly with shielding capabilities.

In order to achieve the objects set forth, a mounting assembly for attaching an electrical connector to an electronic device in accordance with the present invention includes a plurality of latching members and a housing. The latching members outwardly extend from a periphery of an opening defined in the panel of the electronic device. Each latching member includes a pair of protrusions outwardly extending therefrom. The housing for receiving a connector device is attached to the panel of the electronic device and includes a mating surface and a connecting surface opposite the mating surface. A cavity for receiving the connector device therein is defined in the mating surface of the housing. Each latching member is received in a corresponding connecting channel defined in the housing in communication with the cavity and the protrusions thereof contact a shield of the connector device.

Other objects, advantages and novel features of the invention will become more apparent from the following detailed description when taken in conjunction with the accompanying drawings.

DETAILED DESCRIPTION OF THE INVENTION

Figure 1:
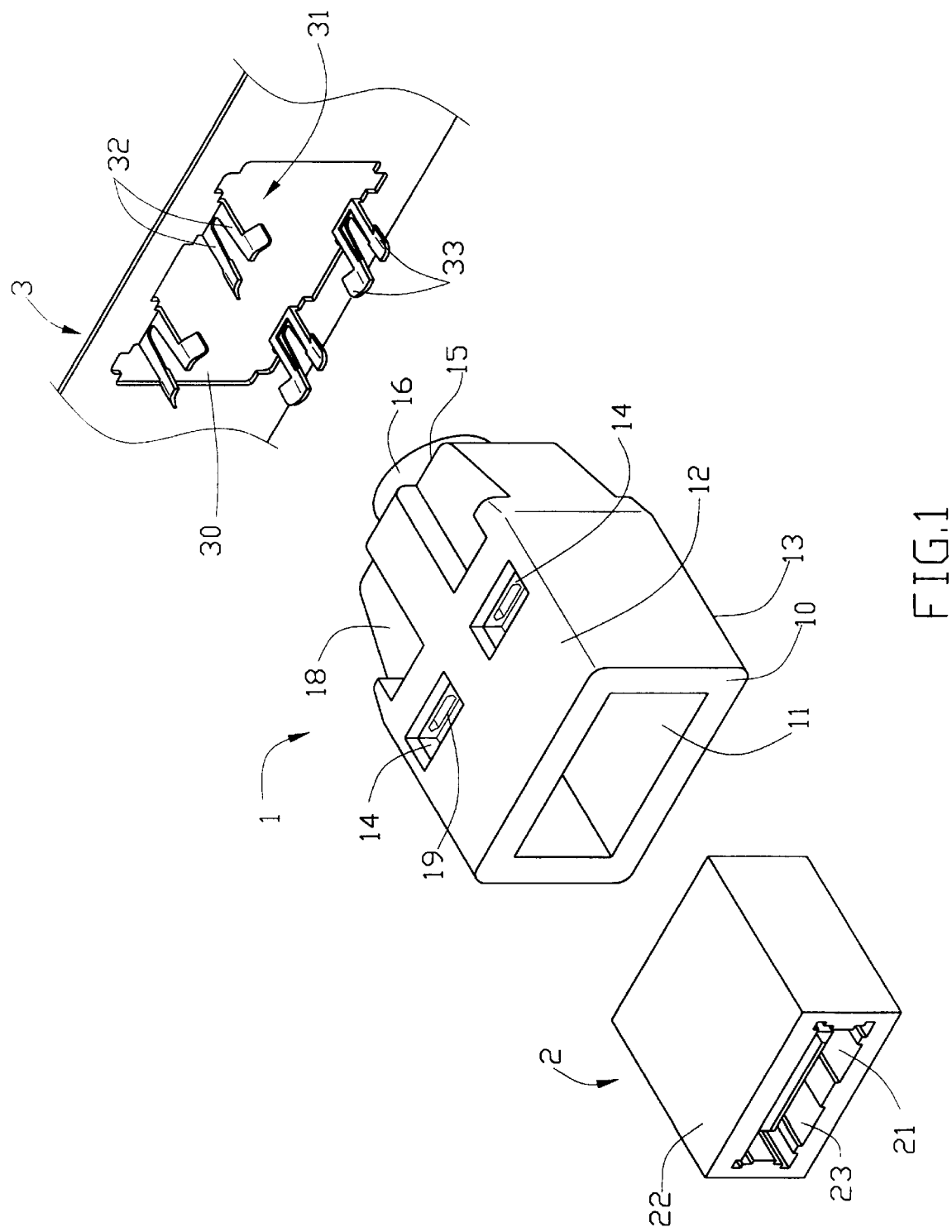
FIG. 1 is an exploded view of an electrical connector assembly in accordance with a preferred embodiment of the present invention.
Figure 2:
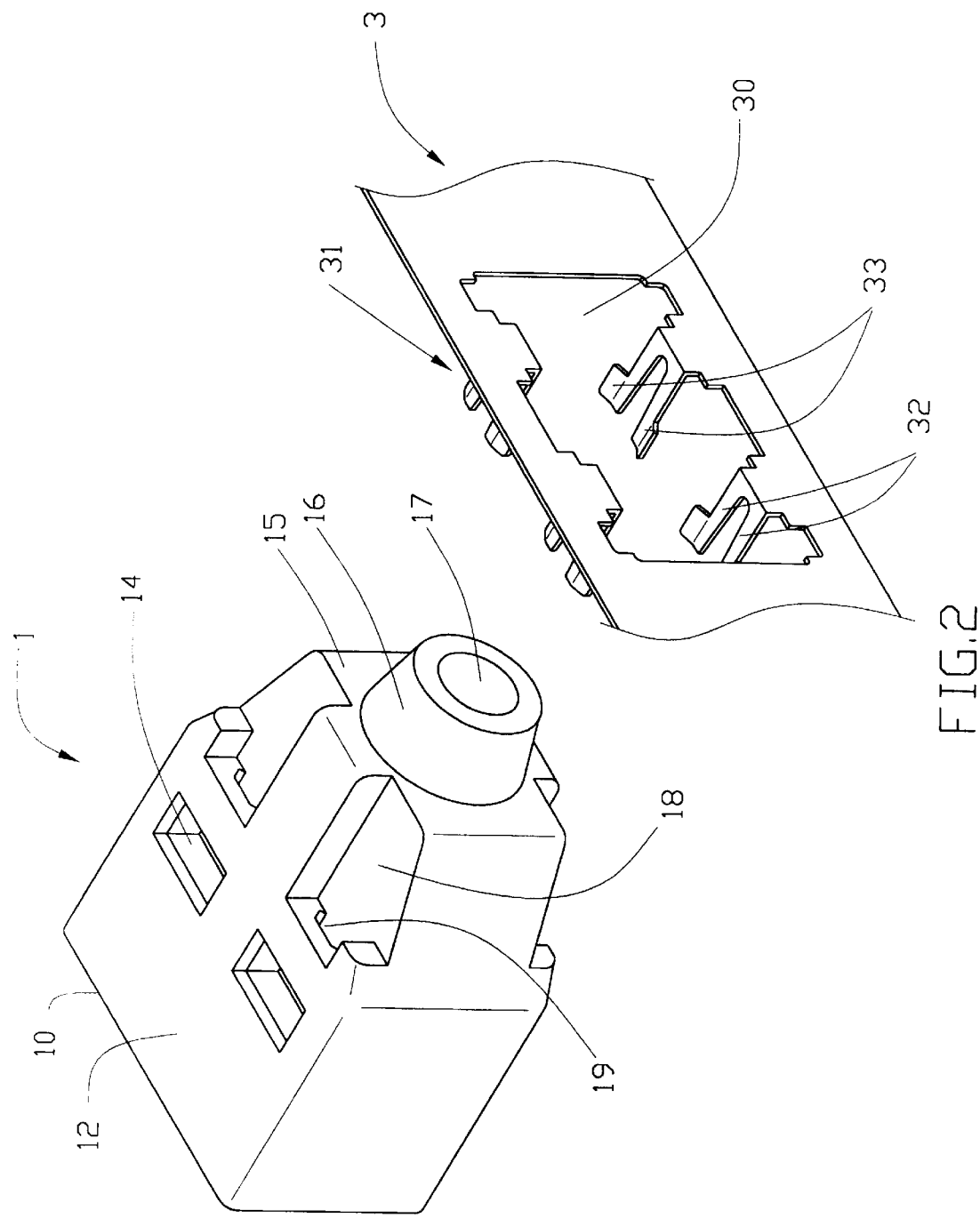
FIG. 2 is a perspective view of a mounting assembly.

Referring to FIGS. 1 and 2, a mounting assembly in accordance with a preferred embodiment of the present invention comprises a housing 1 for receiving a connector device 2, and two pairs of latching members 31 extending from a PC panel 3.

The housing 1 is formed by a mating surface 10, a top wall 12, a bottom wall 13, and a connecting surface 15. A cavity 11 is defined in the mating surface 10 for receiving the connector device 2 therein. It should be understood that, although the housing 1 and the connector device 2 are shown as separate parts, the housing 1 also can be insert molded over the connector device 2 to form an integral electrical connector. A pair of connecting holes 14 is defined through each top and bottom walls 12, 13 in communication with the cavity 11. A cylindrical base 16 is formed on the connecting surface 15 and has a through hole 17 defined therethrough in communication with the cavity 11 for the extension of cables (not shown) electrically interconnecting the inserted connector shield 2 and the electrical device. A pair of recesses 18 is disposed on each of the top and bottom walls 12, 13 in alignment with the connecting holes 14 for guiding the housing 1 to properly engage with the PC panel 3 (detailed description thereof will be provided afterward). A pair of connecting channels 19 is defined through each of the top and bottom walls 12, 13 of the housing 1 in communication with the cavity 11 for communicating each connecting hole 14 to the corresponding recess 18 thereby facilitating extension of the corresponding latching member 31 from the recess 18 to the connecting hole 14.

The connector device 2 defines a receiving chamber 23 having mating grooves 21 defined on inner surfaces thereof for facilitating correct insertion of a mating connector (not shown) and a shield 22 is assembled thereto. An opening 30 is defined in the PC panel 3 for extension of the housing 1. Each pair of latching members 31 outwardly extend from a periphery of the opening 30 and jointly define a space for receiving the housing 1. Each latching member 31 includes a pair of arms 32 each having a protrusion 33 outwardly extending from a free end thereof. An outer end of the protrusion 33 is chamfered to facilitate a guiding entrance of the latching member 31 into the connecting channel 19.

Figure 3:
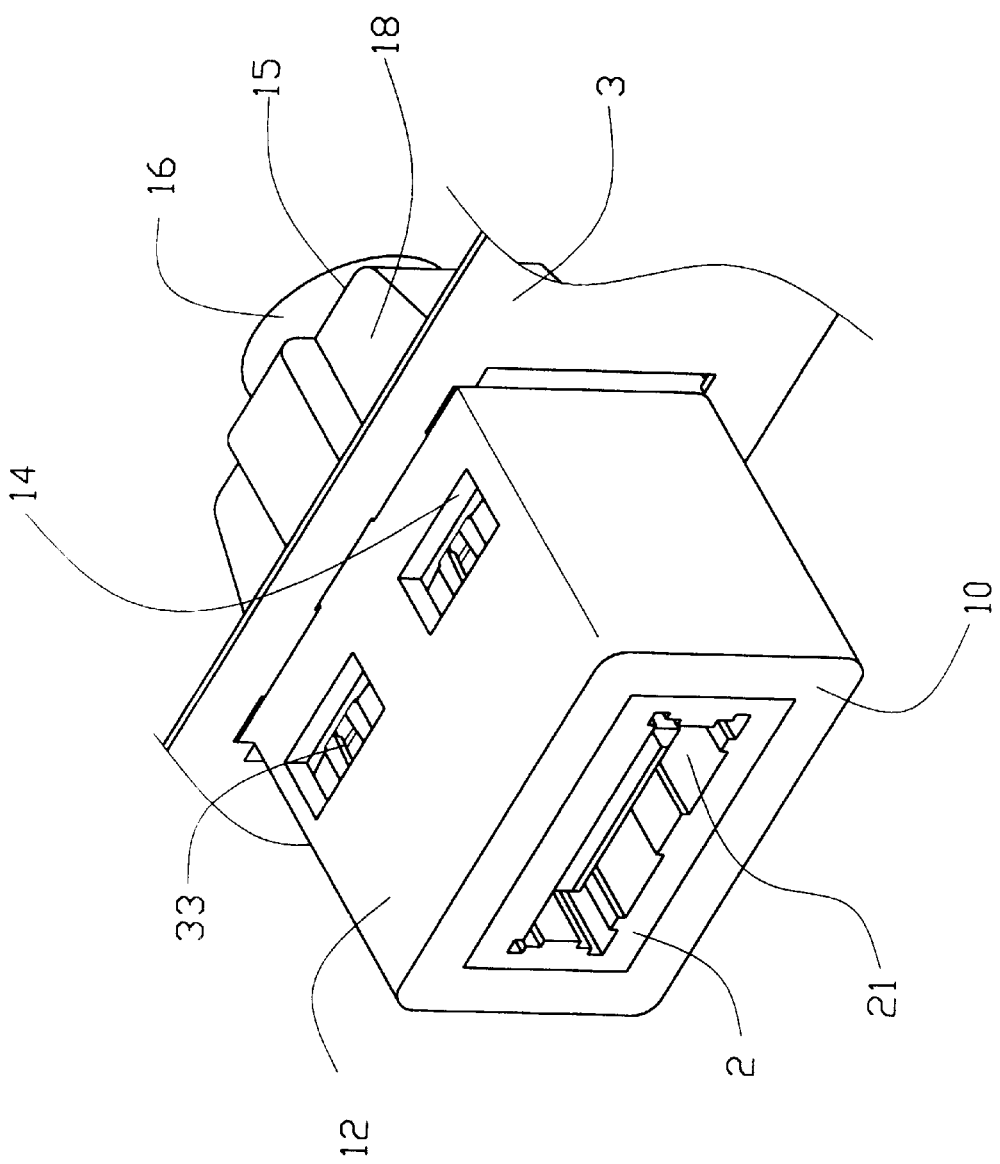
FIG. 3 is an assembled view of FIG. 1.
Figure 4:
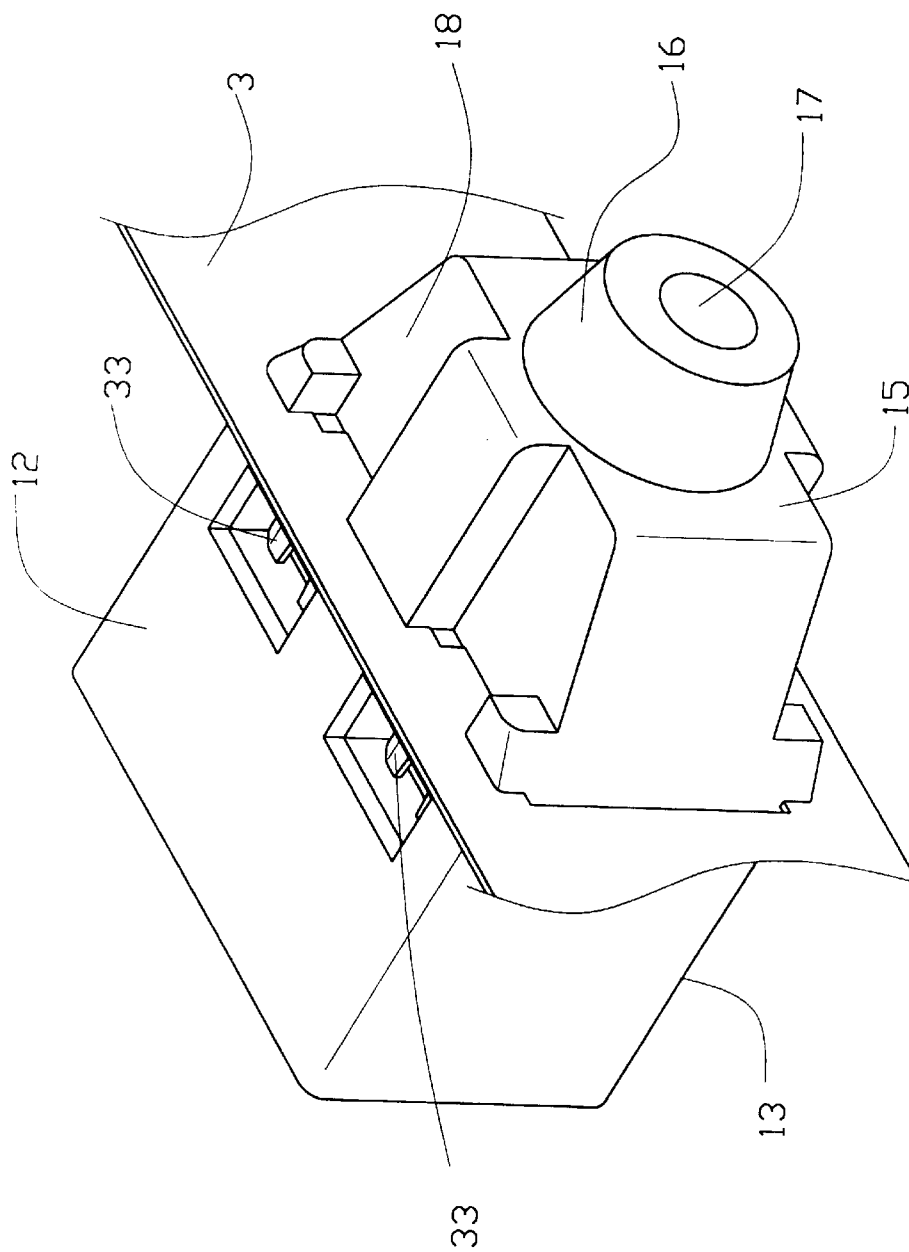
FIG. 4 is similar to FIG. 3 but taken from a different angle.
Figure 5:
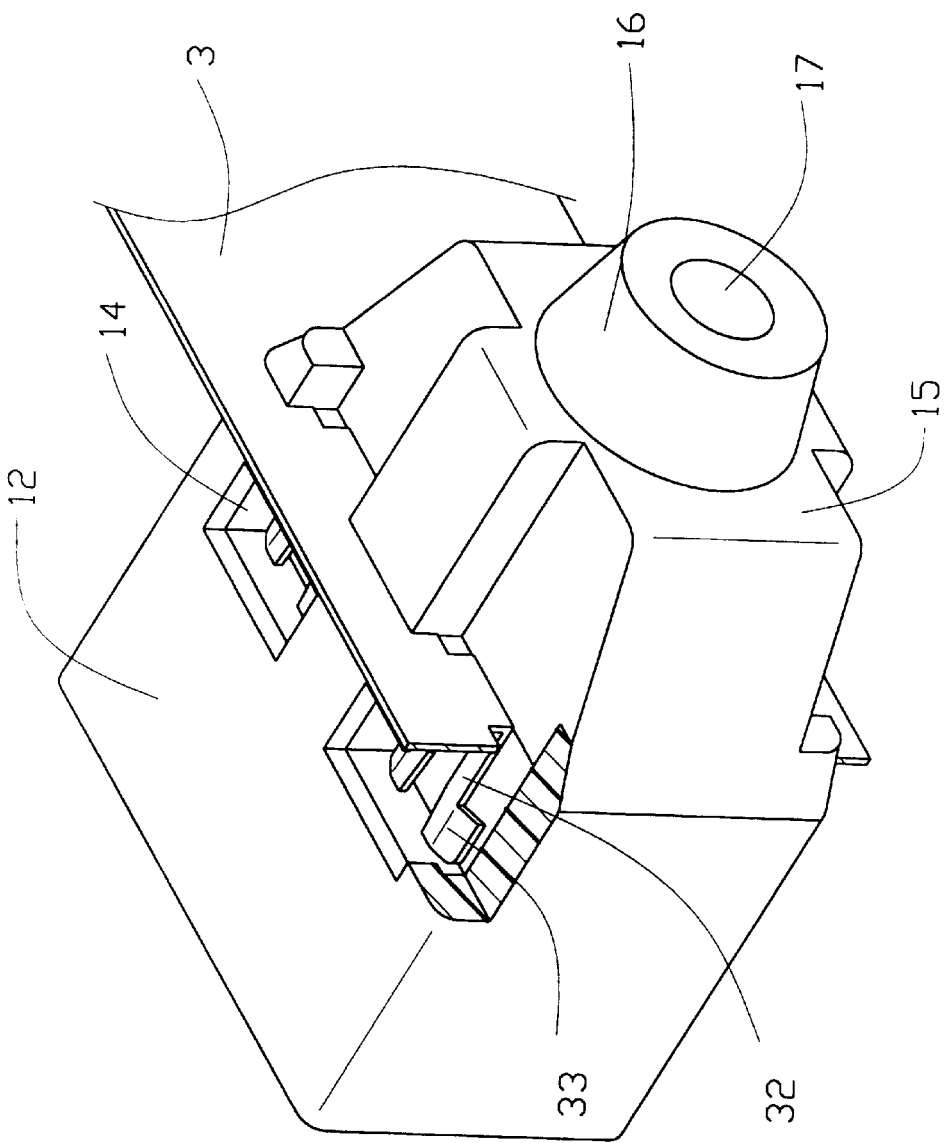
FIG. 5 is a partial cutaway view of FIG. 4.

Referring to FIGS. 3, 4 and 5, in assembly, the housing 1 receives the connector device 2 thereby defining an electrical connector. The housing 1 is then inserted through the opening 30 of the PC panel 3 whereby the connecting surface 15 is passed therethrough. The latching members 31 are received in the corresponding connecting channels 19 of the housing 1 with the protrusions 33 of the latching members 31 engaging with inner surfaces of the corresponding connecting holes 14. Furthermore, the protrusions 33 of the latching members 31 are bent to contact the shield 22 of the connector device 2 thereby establishing grounding path between the connector device 2 and the pad 3.

It is to be understood, however, that even though numerous characteristics and advantages of the present invention have been set forth in the foregoing description, together with details of the structure and function of the invention, the disclosure is illustrative only, and changes may be made in detail, especially in matters of shape, size, and arrangement of parts within the principles of the invention to the full extent indicated by the broad general meaning of the terms in which the appended claims are expressed.

I claim:

1. An electrical arrangement, comprising:
   a panel of an electronic device extending in a plane with an opening defined therein, said panel forming two pairs of latching members projecting therefrom and located near a periphery of the opening;
   an electrical connector attached to the panel including:
      a housing comprising a mating surface, an opposite connecting surface and a cavity disposed in the mating surface, the housing further defining two pairs of connecting channels in top and bottom walls thereof corresponding to the two pairs of latching members of the panel and receiving and engaging corresponding latching members at a position where the connecting and mating surfaces are located outside the opening; and
      a connector device received in the cavity of the housing, said connector device defining a receiving chamber for receiving a mating connector in a direction perpendicular to the plane of the panel.

2. The arrangement as described in claim 1, wherein the housing comprises two pairs of recesses disposed thereon in communication with the connecting channels for guiding the latching members into the connecting channels.

3. The arrangement as described in claim 1, wherein the connecting channels communicate with the cavity.

4. The arrangement as described in claim 1, wherein the latching members are arranged in two rows, each latching member of a given row being vertically aligned with a corresponding latching member of the other row, each latching member including a pair of resilient arms, each arm having a protrusion outwardly extending from a free end thereof.

5. The arrangement as described in claim 4, wherein an outer end of the protrusion of the latching arm is chamfered to facilitate a guiding entrance of the latching member into the connecting channel.

6. A mounting assembly attaching an electrical connector to a device panel defining an opening, the electrical connector including a housing and a connector device received in the housing, the connector device having a shield attached thereto, the assembly comprising:
   a pair of latching members extending from a periphery of the panel opening; and
   the housing of the electrical connector extending through and received in the panel opening, the housing comprising a mating surface defining a cavity, an opposite connecting surface, and a pair of connecting holes disposed in the housing in communication with the cavity; wherein
   when the housing moves toward the panel and the connecting surface thereof extends through the panel opening, the latching members extend into the corresponding connecting holes to contact the shield of the connector device thereby establishing a grounding path between the connector device and the panel.

7. The assembly as described in claim 6, wherein the receptacle comprises a pair of connecting channels parallel to the latching members and in communication with the connecting holes for receiving and engaging the latching members.

8. The assembly as described in claim 6, wherein each latching member includes a pair of protrusions having a predetermined resiliency.

9. The assembly as described in claim 8, wherein each pair of protrusions is bent at a predetermined angle.

10. The assembly as described in claim 9, wherein the pair of resilient protrusions extends through the connecting channels and is retained in the connecting holes to contact the shield of the connector device.

11. The assembly as described in claim 6, wherein the connecting holes are exposed to an exterior of the housing to reveal if the pair of protrusions is properly engaged with the shield of the connector device.

12. An electrical connector mounting assembly comprising:
   a housing comprising a mating surface for receiving a connector device therein to form an electrical connector, and a connecting surface opposite to said mating surface;
   a device panel defining an opening corresponding to a lateral cross-section of said housing;
   a plurality of latching members extending from the panel toward the mating surface of the housing, each latching member having a pair of resilient arms; and
   a plurality of connecting holes formed within the housing; wherein
      when the housing moves toward the panel and the connecting surface of the housing extends through the opening, the resilient arms of the latching members are resiliently engaged with opposite inner sides of the connecting holes so that the housing can be securely assembled to the panel.

13. The assembly as described in claim 12, wherein the latching members integrally extend from edges of said opening of the enclosure.

14. The assembly as described in claim 12, wherein the housing defines a plurality of connecting channels parallel to the latching members and in communication with the connecting holes for engaging with the latching members and for allowing extension of the latching members into the corresponding connecting holes.

* * * * *